(12) United States Patent
Braun et al.

(10) Patent No.: US 12,378,331 B2
(45) Date of Patent: Aug. 5, 2025

(54) METHOD FOR SYNTHESISING POLYMERS BY CONTROLLED-RADICAL INVERSE EMULSION POLYMERISATION

(71) Applicant: SNF GROUP, Andrezieux Boutheon (FR)

(72) Inventors: Olivier Braun, Andrezieux Boutheon (FR); Emmanuelle Read, Andrezieux Boutheon (FR); Thierry Leblanc, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 1137 days.

(21) Appl. No.: 17/288,594

(22) PCT Filed: Nov. 4, 2019

(86) PCT No.: PCT/FR2019/052609
§ 371 (c)(1),
(2) Date: Apr. 26, 2021

(87) PCT Pub. No.: WO2020/094963
PCT Pub. Date: May 14, 2020

(65) Prior Publication Data
US 2021/0380729 A1  Dec. 9, 2021

(30) Foreign Application Priority Data

Nov. 6, 2018 (FR) .................................. 1860202

(51) Int. Cl.
| | | |
|---|---|---|
| C08F 2/32 | (2006.01) | |
| C08F 2/38 | (2006.01) | |
| C08F 220/06 | (2006.01) | |
| C08F 220/56 | (2006.01) | |
| C08F 293/00 | (2006.01) | |

(52) U.S. Cl.
CPC ............... C08F 2/32 (2013.01); C08F 2/38 (2013.01); C08F 220/06 (2013.01); C08F 220/56 (2013.01); C08F 293/005 (2013.01); C08F 2400/02 (2013.01)

(58) Field of Classification Search
CPC .. C08F 2/32; C08F 2/38; C08F 220/06; C08F 220/56; C08F 293/005; C08F 2400/02
See application file for complete search history.

(56) References Cited

U.S. PATENT DOCUMENTS

| | | | | |
|---|---|---|---|---|
| 4,906,701 A | * | 3/1990 | Clark, Jr. ................. | C08F 2/32 |
| | | | | 526/264 |
| 2007/0287815 A1 | | 12/2007 | Gaillard et al. | |
| 2011/0224377 A1 | * | 9/2011 | Mahanthappa ..... | C08F 293/005 |
| | | | | 525/200 |
| 2012/0004381 A1 | * | 1/2012 | Rizzardo ............... | C07C 329/20 |
| | | | | 526/204 |
| 2023/0357461 A1 | * | 11/2023 | Davidson .............. | C08F 120/56 |
| 2025/0032398 A1 | * | 1/2025 | Musa ....................... | A61K 8/06 |

FOREIGN PATENT DOCUMENTS

| | | |
|---|---|---|
| CN | 104693385 A | 6/2015 |
| EP | 0991683 B1 | 10/2002 |
| FR | 2868783 A1 | 10/2005 |
| WO | 2012/042167 A1 | 4/2012 |

OTHER PUBLICATIONS

International Search Report (and English translation) and Written Opinion of the International Searching Authority for International Application No. PCT/FR2019/052609 mailed on Feb. 3, 2020.
Peng, H., et al., "Water-Soluble Reactive Copolymers Based on Cyclic N-Vinylamides with Succinimide Side Groups for Bioconjugation with Proteins", Macromolecules, vol. 48, pp. 4256-4268 (2015).

* cited by examiner

*Primary Examiner* — Jane L Stanley
(74) *Attorney, Agent, or Firm* — HESLIN ROTHENBERG FARLEY & MESITI P.C.

(57) ABSTRACT

The present invention relates to a method for preparing a polymer reverse emulsion polymerization comprising the following steps:
 a) Preparation of an aqueous phase comprising at least one water-soluble monomer and at least one water-soluble precursor of formula (I):

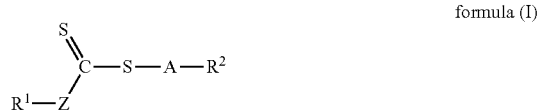

formula (I)

b) Preparation of an organic phase comprising a lipophilic solvent and at least one water-in-oil surfactant,
 c) Mixing the aqueous phase and the organic phase while stirring to form an inverse emulsion,
 d) Once the inverse emulsion has been formed, addition of a radical polymerization initiator in said inverse emulsion, and obtaining a polymer by polymerization of at least one water-soluble monomer.

20 Claims, 1 Drawing Sheet

METHOD FOR SYNTHESISING POLYMERS BY CONTROLLED-RADICAL INVERSE EMULSION POLYMERISATION

CROSS REFERENCE TO RELATED APPLICATIONS

This application is a national stage filing under section 371 of International Application No. PCT/FR2019/052609 filed on Nov. 4, 2019, and published on May 14, 2020 as WO 2020/094963, which claims priority to French Application No. 1860202, filed on Nov. 6, 2018. The entire contents of WO 2020/094963 are hereby incorporated herein by reference.

FIELD OF INVENTION

The present invention relates to a novel process for radical polymerization in reverse emulsion.

PRIOR ART

The simplicity of implementation of conventional radical polymerization makes it a method of choice as a route for the synthesis of high molecular weight polymers at the industrial level. It is, in fact, applicable to a wide range of monomers, tolerant of the functional groups carried by the monomers or of the impurities present in the reaction medium, reproducible, compatible in a homogeneous or heterogeneous medium and can be carried out in a protic solvent, including water.

However, this technique does not allow access to precise chain lengths. In addition, the chains of different sizes will imply a fairly high dispersity. During a conventional radical copolymerization of two types of monomers, a composition drift also appears if one type of monomer is consumed more rapidly than the other. Access to polymers with macromolecular architectures and controlled microstructures then proves to be difficult.

Living ionic polymerization allows access to controlled architectures but it is difficult to implement and requires demanding conditions, such as a medium free of impurities, water and/or traces of oxygen.

Radical polymerizations by reversible deactivation (RDRP) combine both the ease of implementation of conventional radical polymerization and the liveliness of ionic polymerization.

RDRP combines techniques such as iodine transfer polymerization (ITP), polymerization controlled by nitroxides, NMP (Nitroxide Mediated Polymerization), by atom transfer, ATRP (Atom Transfer Radical Polymerization), RAFT (Reversible Addition Fragmentation chain Transfer Polymerization), which includes MADIX technology (MAcromolecular Design by Interchange of Xanthates), various variations of polymerizations with organometallic compounds, OMRP (Organometallic Mediated Radical Polymerization), radical polymerization controlled by heteroatomic compounds (OrganoHeteroatom-mediated Radical Polymerization (OHRP).

All of these techniques are based on a reversible equilibrium between a dormant species and an active species (growing macro-radical), as illustrated in FIG. 1.

This activation-deactivation process allows the chains to grow at the same speed until the total consumption of the monomer, making it possible to control the molecular weights of the polymers and obtain narrow molecular weight distributions. This will also make it possible to minimize the heterogeneity of the composition. The reversible deactivation of the growing chains is at the origin of the minimization of the irreversible termination reactions. The vast majority of polymer chains remain in dormant form and are therefore reactivatable. It is then possible to functionalize the chain ends in order to initiate other modes of polymerization or to make chain extensions. This is the key to accessing high molecular weights, controlled compositions and architectures.

Controlled radical polymerization therefore has the following distinctive aspects:
1. the number of polymer chains is fixed throughout the duration of the reaction,
2. the polymer chains all grow at the same speed, which results in:
   a linear increase in molecular weights,
   a tight molecular weight distribution,
3. the average molecular weight is controlled by the monomer/precursor molar ratio.

The controlled character is all the more marked as the speed of reactivation of the radical chains is very high compared to the speed of growth of the chains (propagation). However, in certain cases, the speed of reactivation of the radical chains is greater than or equal to the speed of propagation. In these cases, conditions 1 and 2 are not observed and, therefore, control of molecular weights is not possible.

Patent EP 991 683 describes a direct emulsion controlled radical polymerization. This mode of polymerization requires a step of recovering the polymer, such as, for example, vacuum evaporation. The polymers described in patent EP 991 683 are obtained by polymerization of lipophilic monomers. Thus, in the case of an emulsion polymerization, the emulsion is a direct emulsion and the monomers are polymerized in the dispersed phase, namely the organic phase. The technique presented leads to block polymers of low molecular weight.

Patent application WO 2012/042167 uses the gel polymerization route. Although using water-soluble precursors, this technique does not make it possible to obtain polymers of high molecular weight.

The problem which the Applicant proposes to solve is to obtain water-soluble polymers of high molecular weight while having a low polydispersity index, advantageously less than 2.

DISCLOSE THE INVENTION

The invention relates to a process for preparing a polymer by reverse emulsion polymerization comprising the following steps:
a) Preparation of an aqueous phase comprising at least one water-soluble monomer and at least one water-soluble precursor of formula (I):

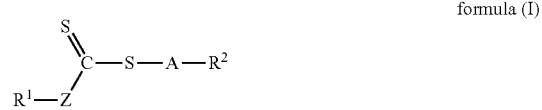

formula (I)

in which
Z=O, S or N,
R$^1$ and R$^2$, identical or different, represent:
   an optionally substituted alkyl, acyl, alkenyl or alkynyl group (i), or a carbon-based ring (ii), saturated or not, optionally substituted or aromatic, or a heterocycle (iii), saturated or not, optionally substituted or aromatic, these groups and rings (i), (ii) and (iii) possibly being substituted by substituted aromatic groups or alkoxycarbonyl or aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxy (—OH), amino (—NR$_2$), halogen, allyl, epoxy, alkoxy (—OR), S-alkyl, S-aryl, groups having a hydrophilic or ionic character such as alkali metal salts of carboxylic acids, alkali metal salts of sulfonic acid, polyalkylene oxide chains (POE, POP), cationic substituents (quaternary ammonium salts), R representing an alkyl or aryl group, A is a linear or structured polymer chain comprising n identical or different monomers, n is an integer between 1 and 500, advantageously between 2 and 500, b) Preparation of an organic phase comprising a lipophilic solvent and at least one water-in-oil surfactant, c) Mixing the aqueous phase and the organic phase with stirring to form an inverse emulsion, d) Once the inverse emulsion has been formed, addition of a radical polymerization initiator in said inverse emulsion and obtaining a polymer by polymerization of at least one water-soluble monomer.

In formula (I), $R^1$ and $R^2$ are identical or different and advantageously represent a group (i) (alkyl, acyl, alkenyl or alkynyl), more advantageously a group chosen from a linear or branched alkyl group comprising from 1 to 20 carbon atoms, preferably 1 to 10 carbon atoms; a linear or branched acyl group comprising from 2 to 20 carbon atoms, preferably from 2 to 10 carbon atoms; a linear or branched alkenyl group comprising from 2 to 20 carbon atoms, preferably from 2 to 10 carbon atoms; or a linear or branched alkynyl group comprising from 2 to 20 carbon atoms, preferably from 2 to 10 carbon atoms; these groups being optionally substituted with one or more substituted aromatic groups which may comprise 4 to 7 carbon atoms or alkoxycarbonyl or aryloxycarbonyl (—COOR), carboxy (—COOH), acyloxy (—O$_2$CR), carbamoyl (—CONR$_{2)\ groups}$) cyano (—CN), alkylcarbonyl, alkylarylcarbonyl, arylcarbonyl, arylalkylcarbonyl, phthalimido, maleimido, succinimido, amidino, guanidimo, hydroxy (—OH), amino (—NR$_2$), halogen, allyl, epoxy, alkoxy (—OR), S-alkyl, S-aryl, groups having a hydrophilic or ionic character such as alkali metal salts of carboxylic acids, alkali metal salts of sulfonic acid, polyalkylene oxide chains (POE, POP), cationic substituents (quaternary ammonium salts).

R advantageously represents a linear or branched alkyl group comprising from 1 to 20 carbon atoms, preferably from 1 to 10 carbon atoms, or aryl comprising from 6 to 10 carbon atoms.

Advantageously, a carbon ring (ii) comprises from 6 to 10 carbon atoms. On the other hand, a heterocycle (iii) advantageously comprises from 5 to 9 carbon atoms.

A group comprising carbon atoms is a hydrocarbon group which may optionally comprise heteroatoms. In addition, a heterocyclic comprises 1 or more heteroatoms, advantageously N, O, S or P.

Not monomer, is meant a molecule capable of forming a polymer by polymerization, advantageously a molecule having vinyl unsaturation (CH$_2$=CH— and its derivatives formed by substitution of at least one hydrogen). In order not to affect the clarity of the description, the term monomer also designates the monomer in its polymerized form. In other words, the acrylamide monomer denotes CH$_2$=CH—C(=O)NH$_2$ as well as the pattern —(CH$_2$—CH(C(=O)NH$_2$))—.

In the NR$_2$ functions, the two R groups can be identical or different from one another.

Step d) makes it possible to obtain a water-soluble polymer. It is a homopolymer or a copolymer.

The expression "reverse emulsion" denotes both reverse emulsions and reverse microemulsions. These are emulsions of the water-in-oil type in which the aqueous phase is dispersed in the organic phase in the form of drops or droplets.

The expression "water-soluble precursor" denotes a precursor soluble in water, at a temperature of 25° C., in a proportion of at least 50 g/l. This definition also concerns the other water-soluble compounds mentioned (polymer, monomer, etc.)

In general, the polymer chain A comprises at least one nonionic monomer and/or at least one anionic monomer and/or at least one cationic monomer. Advantageously, A comprises at least two identical monomers.

The following different types of monomers can be used as the monomers of the aqueous phase or in the polymer chain A of the precursor.

The nonionic monomer(s) which can be used within the framework of the invention can be chosen, in particular, from the group comprising vinyl monomers soluble in water. Preferred monomers belonging to this class are, for example, acrylamide, methacrylamide; N-isopropylacrylamide; N,N-dimethylacrylamide; N,N diethylacrylamide; N-methylolacrylamide; N-vinylformamide; N-vinyl acetamide; N-vinylpyridine; N-vinylpyrrolidone; acryloyl morpholine (ACMO), glycidyl methacrylate, glyceryl methacrylate and diacetone acrylamide. A preferred nonionic monomer is acrylamide.

The anionic monomer(s) are preferably chosen from acrylic acid; methacrylic acid; itaconic acid; crotonic acid; maleic acid; fumaric acid; 2-acrylamido 2-methylpropane sulfonic acid; vinylsulfonic acid; vinylphosphonic acid; allylsulfonic acid; allylphosphonic acid; styrene sulfonic acid, said anionic monomer being unsalified, partially or totally salified, and salts of 3-sulfopropyl methacrylate. The salified form advantageously corresponds to alkali metal (Li, Na, K, etc.), alkaline earth metal (Ca, Mg, etc.) or ammonium salts, in particular quaternary ammoniums.

The cationic monomer(s) which can be used in the context of the invention can be chosen, in particular from monomers of the acrylamide, acrylic, vinyl, allylic or maleic type having a quaternary ammonium function by salification or quaternization. Mention may be made, in particular and without limitation, of quaternized dimethylaminoethyl acrylate (ADAME), quaternized dimethylaminoethyl methacrylate (MADAME), dimethyldiallylammonium chloride (DADMAC), acrylamido propyltrimethyl ammonium chloride (APTAC), and methacrylamido propyltrimethyl ammonium chloride (MAPTAC), said cationic monomer being unsalified, partially or totally salified.

The cationic monomer(s) can also be chosen from associative cationic monomers as described in patent FR 2 868 783.

The monomer can optionally be a zwitterionic monomer of acrylamide, acrylic, vinyl, allylic or maleic type having an amine or quaternary ammonium function and an acid function of carboxylic, sulphonic or phosphoric type. Mention may be made, in particular and without limitation, of derivatives of dimethylaminoethyl acrylate, such as 2-((2-(acryloyloxy) ethyl) dimethylammonio) ethane-1-sulfonate, 3-((2-(acryloyloxy) ethyl) dimethylammonio) propane-1-sulfonate, 4-((2-(acryloyloxy) ethyl) dimethylammonio) butane-1-sulfonate, [2-(acryloyloxy)ethyl)](dimethylammonio) acetate, derivatives of dimethylaminoethyl methacrylate such as 2-((2-(methacryloyloxy) ethyl) dimethylammonio) ethane-1-sulfonate, 3-((2-(methacryloyloxy) ethyl) dimethylammonio) propane-1-sulfonate, 4-((2-(methacryloyloxy) ethyl) dimethylammonio) butane-1-sulfonate, [2-(methacryloyloxy)ethyl)] (dimethylammonio) acetate, derivatives of dimethylamino propylacrylamide such as 2-((3-acrylamidopropyl) dimethylammonio) ethane-1-sulfonate, 3-((3-acrylamidopropyl) dimethylammonio) propane-1-sulfonate, 4-((3-acrylamidopropyl) dimethylammonio) butane-1-sulfonate, the [3-(acryloyloxy) propyl)] (dimethylammonio) acetate, derivatives of dimethylamino propyl methylacrylamide such as 2-((3-methacrylamidopropyl) dimethylammonio) ethane-1-sulfonate, 3-((3-methacrylamidopropyl) dimethylammonio) propane-1-sulfonate, 4-((3-methacrylamidopropyl) dimethylammonio) butane-1-sulfonate and [3-(methacryloyloxy)propyl)] (dimethylammonio) acetate.

The monomer can optionally have an LCST group or a UCST group.

According to the general knowledge of those skilled in the art, a group at LCST corresponds to a group whose solubility in water for a determined concentration is modified beyond a certain temperature and according to the salinity. This is a group exhibiting a transition temperature by heating defining its lack of affinity with the solvent medium. The lack of affinity with the solvent results in an opacification or a loss of transparency which may be due to precipitation, aggregation, gelation or viscosification of the medium. The minimum transition temperature is called "LCST" (lower critical solubility temperature). For each group concentration at LCST, a heating transition temperature is observed. It is greater than the LCST which is the minimum point of the curve.

Below this temperature, the polymer is soluble in water, above this temperature, the polymer loses its solubility in water.

Usually, the LCST can be measured visually: the temperature at which the lack of affinity with the solvent appears, that is to say the cloud point, is determined. The cloud point corresponds to the opacification of the solution or loss of transparency.

The LCST can also be determined according to the type of phase transition, for example by DSC (differential scanning calorimetry), by a measurement of transmittance or by a measurement of viscosity.

Preferably, the LCST is determined by determining the cloud point by transmittance according to the following protocol.

The transition temperature is measured for a compound at LCST for a solution having a concentration by weight in deionized water of 1% by weight of said compound. The cloud point corresponds to the temperature at which the solution exhibits a transmittance equal to 85% of light rays having a wavelength between 400 and 800 nm.

In other words, the temperature at which the solution exhibits a transmittance equal to 85% corresponds to the minimum LCST transition temperature of the compound, in this case of the macromonomer at LCST.

In general, a transparent composition exhibits a maximum light transmittance value, whatever the wavelength between 400 and 800 nm, through a sample 1 cm thick, of at least 85%, preferably at least 90%. This is the reason why the cloud point corresponds to a transmittance of 85%.

According to the general knowledge of those skilled in the art, a UCST group corresponds to a group of which the solubility in water for a determined concentration, is modified below a certain temperature and according to the salinity. This is a group that has a cooling transition temperature that defines its lack of affinity with the solvent medium. The lack of affinity with the solvent results in an opacification or a loss of transparency which may be due to precipitation, aggregation, gelation or viscosification of the medium. The maximum transition temperature is called "UCST" (upper critical solubility temperature). For each group concentration at UCST, a cooling transition temperature is observed. It is greater than the UCST which is the minimum point of the curve. Above this temperature, the polymer is soluble in water, below this temperature, the polymer loses its solubility in water.

According to a preferred embodiment, the precursor is of formula (I) in which:
Z=O.

According to another preferred embodiment, the precursor is of formula (I) wherein:
Z=O,
A is a linear or structured polymer chain obtained from 1 to 100 (advantageously 2 to 100) monomers comprising at least one nonionic monomer and/or at least one anionic monomer and/or at least one cationic monomer.

According to another preferred embodiment, the precursor is of formula (I) wherein:
Z=O,
A is a linear or structured polymer chain obtained from 1 to 100 (advantageously 2 to 100) monomers comprising at least one nonionic monomer and/or at least one anionic monomer and/or at least one associative cationic monomer.

According to another preferred embodiment, the precursor is of formula (I) wherein:
Z=O,
A is a linear or structured polymer chain obtained from 1 to 100 (advantageously 2 to 100) monomers comprising at least one nonionic monomer and/or at least one anionic monomer and/or at least one monomer comprising a group at LCST.

Advantageously, A consists of n identical nonionic monomers. More preferably, A is polyacrylamide.

According to another preferred embodiment, the precursor is of the following formula (II):

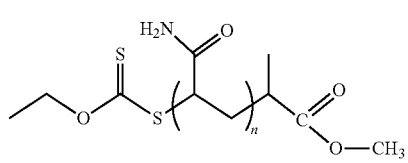

Formula (II)

in which "n" denotes an integer between 1 and 100, preferably between 1 and 50.

According to another embodiment, in formula (I) or (II), "n" denotes an integer between 2 and 100, preferably between 3 and 100, more preferably between 4 and 50.

According to the invention, the amount of precursor in the emulsion may be between $5 \cdot 10^{-7}\%$ and 5% relative to the weight of the emulsion, preferably between $5 \cdot 10^{-4}$ and $5 \cdot 10^{-2}\%$.

The hydrosoluble monomer/precursor molar ratio in the aqueous phase is advantageously between 12,500:1 and 300,000:1, preferably between 27,500:1 and 250,000:1, more preferably between 27,500:1 and 10,000:1.

The radical polymerization initiator can be chosen from the initiators conventionally used in radical polymerization. It may be, for example, one of the following initiators:

hydrogen peroxides such as those selected from the group comprising tertiary butyl hydroperoxide, cumene hydroperoxide, t-butyl-peroxyacetate, t-butylperoxybenzoate, t-butylperoxyoctoate, t-butylperoxyneodecanoate, t-butylperoxyisobutarate, lauroyl peroxide, t-amylperoxypivalte, t-butylperoxypivalate, dicumyl peroxide, benzoyl peroxide, potassium persulfate, and ammonium persulfate, azo compounds such as those chosen from the group comprising 2-2'-azobis (isobutyronitrile), 2,2'-azobis (2-butanenitrile), 4,4'-azobis (4-pentanoic acid), 1,1'-azobis (cyclohexane-carbonitrile), 2-(t-butylazo)-2-cyanopropane, 2,2'-azobis[2-methyl-N-(1,1)-bis(hydroxymethyl)-2-hydroxyethyl] propionamide 2,2'-azobis(2-methyl-N-hydroxyethyl]-propionamide, 2,2'-azobis (N, N'-dimethyleneisobutyramidine) dichloride, 2,2'-azobis (2-amidinopropane) dichloride, 2,2'-azobis (N, N'-dimethyleneisobutyramide), 2,2'-azobis(2-methyl-N-[1,1-bis (hydroxymethyl)-2-hydroxyethyl] propionamide), 2,2'-azobis(2-methyl-N-[1,1-bis (hydroxymethyl) ethyl] propionamide), 2,2'-azobis (2-methyl-N-(2-hydroxyethyl) propionamide], and 2,2'-azobis (isobutyramide) dihydrate, redox systems comprising combinations such as those chosen from the group comprising:

mixtures of a) hydrogen or alkyl peroxide, peresters, or percarbonates and the like and b) any of the salts of iron, titanium salts, zinc formaldehyde sulfoxylate or sodium formaldehyde sulfoxylate, and c) reducing sugars, alkali metal or ammonium persulphates, perborate or perchlorate in combination with an alkali metal bisulphite, such as sodium metabisulphite, and reducing sugars, and alkali metal persulfates in combination with an arylphosphinic acid, such as benzene phosphonic acid and the like, and reducing sugars.

The various monomers used in the aqueous phase can be chosen from the respective lists cited above in the description also relating to the polymer chain A of the precursor. Advantageously, the monomer is chosen from the group comprising nonionic monomers; anionic monomers; and mixtures of nonionic monomers and anionic monomers.

Advantageously, the polymer obtained according to the invention has a molecular weight of between 1,250,000 and 30,000,000 (30 million) g/mol, and preferably between 2,750,000 and 25,000,000 g/mol. Molecular weight is understood as weight average molecular weight.

The polydispersity index (Ip) of the polymer obtained according to the invention is advantageously at most 2 (≤2), preferably at most 1.5 (≤1.5). The polydispersity index is determined according to the following formula:

$Ip=Mw/Mn$

Mw is the weight average molecular weight
Mn is the number average molecular weight The determination of the average molecular weights by weight (Mw) and by number (Mn) is carried out in a conventional manner, advantageously by size exclusion chromatography (CES) coupled to a multi-angle light scattering detector of the Dawn Heleos II type, 18 angles (Wyatt technology).

According to another aspect, the invention relates to the use of polymers obtained according to the polymerization process described above in the oil and gas industry, hydraulic fracturing, paper, water treatment, construction, mining, cosmetics, textiles or detergents. Preferably, the polymers are used in the field of enhanced oil and gas recovery.

The invention and the advantages which result therefrom will emerge more clearly from the following figures and examples given in order to illustrate the invention and not in a limiting manner.

FIGURES

EXAMPLE EMBODIMENTS OF THE INVENTION

Example 1: Synthesis of the Water-Soluble Precursor

In a 50 kg reactor were introduced at room temperature (20° C.), 2 kg of O-ethyl-S-(1-methoxycarbonyl) ethyl dithiocarbonate, 10 kg of acrylamide, 12 kg of water, 20 kg of acetic acid and 140 g of azo initiator (V 044). The mixture was degassed by bubbling with nitrogen and then heated with stirring to 60° C. The polymerization reaction is carried out for 3 hours with stirring.

The water-soluble precursor thus obtained corresponds to formula (I) in which:

$Z=O$,
$R^1=CH_2—CH_3$,
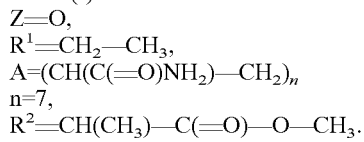
$A=(CH(C(=O)NH_2)—CH_2)_n$
$n=7$,
$R^2=CH(CH_3)—C(=O)—O—CH_3$.

Figure 1:
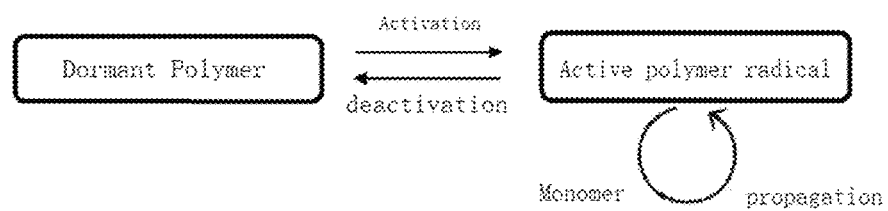
FIG. 1 illustrates the reversible equilibrium between a dormant species and an active species in a process of radical polymerization by reversible deactivation.
Figure 2:
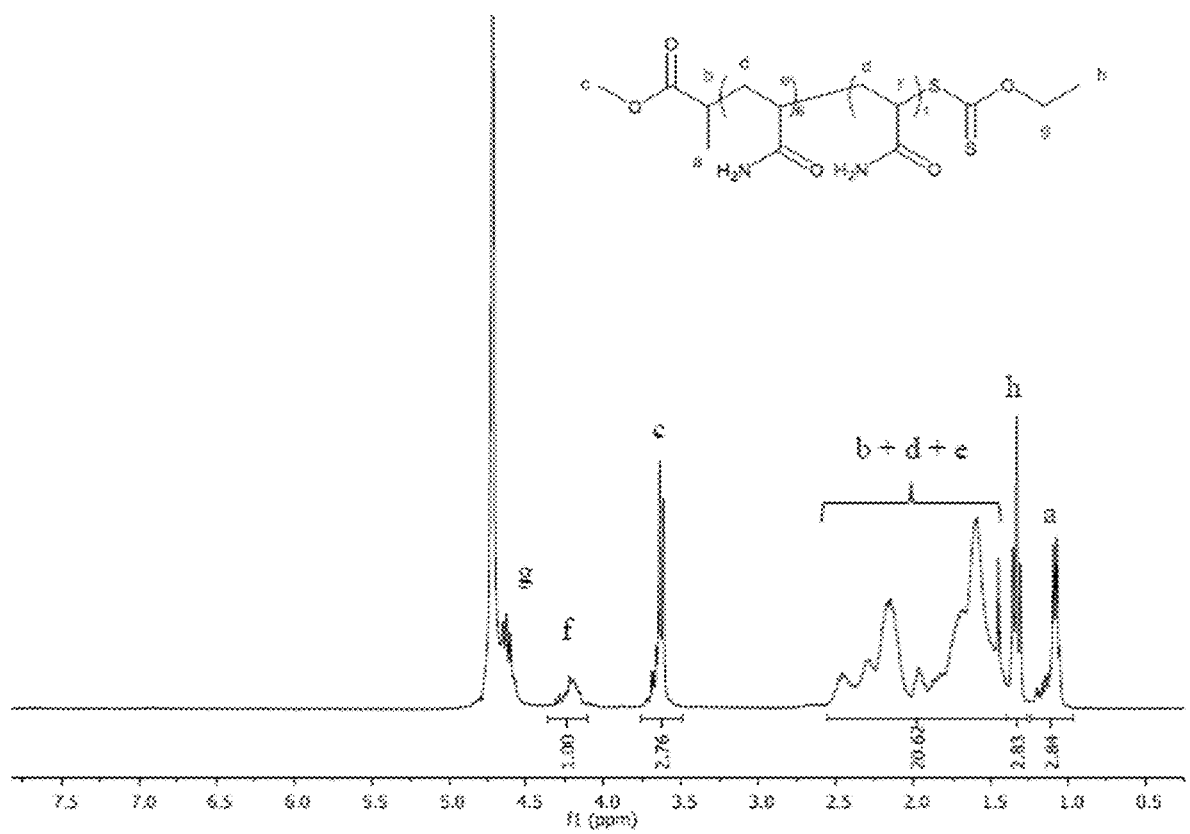
FIG. 2 illustrates the proton nuclear magnetic resonance spectrum ($^1$H NMR) of the water-soluble precursor of formula (I) of Example 1.

This precursor has in particular been characterized by its 1H NMR spectrum (300.13 MHz) in $D_2O$ (FIG. 2).

Example 2: Synthesis of a Polymer P1 in Inverse Emulsion According to the Invention Preparation of the aqueous phase: 400 g of acrylamide (50% by weight in water), 90 g of acrylic acid, 150 g of water and 0.0015% by weight with respect to the emulsion were mixed, of the water-soluble precursor of Example 1. The aqueous phase was neutralized with 90 g of sodium hydroxide (50% by weight in water).

Preparation of the organic phase: all the water-in-oil surfactants (an alkanolamide 2.5% by weight relative to the emulsion, and a stearyl methacrylate 3% by weight relative to the emulsion) were mixed in 200 g of ISOPAR type oil (Isopar N and L).

The aqueous phase and the organic phase were mixed and emulsified. The emulsion was then degassed for 60 minutes before the polymerization was initiated by adding a reducing agent, sodium metabisulfite (SMB).

At the end of the polymerization, the polymer obtained is recovered by precipitation in acetone.

Example 3: Synthesis of a P2 Polymer in Inverse Emulsion

The polymer P2 is synthesized as in Example 2, replacing the water-soluble precursor with sodium hypophosphite.

Example 4: Synthesis of an Inverse Emulsion Polymer P3

The polymer P3 is synthesized as in Example 2 by replacing the water-soluble precursor by the precursor corresponding to formula (I) in which Z=O, $R^1$=CH$_2$—CH$_3$, $R^2$=CH$_3$ and A=CH—(CH$_3$)C(=O)—O—, A is not in being in this case (and contrary to the invention) a monomer.

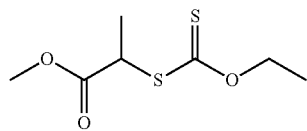

Example 4: Characterization of Polymers P1, P2 and P3

The three polymers P1, P2 and P3 were analyzed by size exclusion chromatography (CES) under the following conditions: one Shodex SB807-G precolumn and two Shodex OHpak columns in series (SB-807 HQ and SB-805 HQ) coupled with a refractive index detector (Optilab T-rEX, Wyatt Technology, and Dawn Heleos II18 angles, Wyatt Technology).

TABLE 1 values of the molecular weights in number and in weight and the polydispersity index of P1, P2 and P3

| Polymer | Mn | Mw | Ip |
|---|---|---|---|
| P1 | $2.10\ 10^6$ | $2.40\ 10^6$ | 1.14 |
| P2 | $2.20\ 10^6$ | $>7.70\ 10^{6*}$ | 3.50 |
| P3 | $>4\ 10^{6*}$ | $>7.70\ 10^{6*}$ | $>1.9*$ |

*the results obtained reach the separation limits of the method. Beyond a molecular weight Mw of $7.10^6$, it is no longer possible to separate the different molecular weights.

At number equivalent molecular weight, the polydispersity of the polymer in the presence of hydrophilic precursor is much lower than that of the polymer prepared by conventional radical polymerization.

The number molecular weight of the polymer P3 was difficult to control because the precursor used is not soluble in water, which is equivalent to polymerization without a precursor.

The invention claimed is:

1. A method for preparing a polymer by reverse emulsion polymerization comprising the following steps:
   a) preparing an aqueous phase comprising at least one water-soluble monomer
   and at least one water-soluble precursor of formula (I):

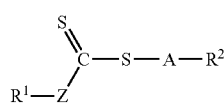

formula (I)

in which
   Z=O, S or N
   $R^1$ and $R^2$, being identical or different, represent:
      an optionally substituted alkyl, acyl, alkenyl or alkynyl group (i), and/or
      a carbon-based ring (ii), saturated or not, optionally substituted, or aromatic, and/or
      a heterocycle (iii), saturated or unsaturated, optionally substituted, or aromatic, and
      which groups and rings (i), (ii) and (iii) may be substituted by: substituted aromatic groups; groups selected from alkoxycarbonyl, aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxy (—OH), amino (—NR$_2$), halogen, allyl, epoxy, alkoxy (—OR), S-alkyl, and S-aryl; and groups having a hydrophilic or ionic character; wherein
   R represents an alkyl or aryl group,
   A is a linear or structured polymer chain comprising n identical or different monomers,
   n is an integer between 1 and 500,
   a) preparing an organic phase comprising a lipophilic solvent and at least one water-in-oil surfactant,
   b) mixing the aqueous phase and the organic phase while stirring to form an inverse emulsion, and
   c) once the inverse emulsion has been formed, adding a radical polymerization initiator to said inverse emulsion, and obtaining a polymer by polymerizing the at least one water-soluble monomer,
wherein the molecular weight of the polymer obtained is between 1,250,000 and 30,000,000 g/mol.

2. The method according to claim 1, wherein Z=O.

3. The method according to claim 1, wherein:
   Z=O, and
   A is a linear or structured polymer chain obtained from 1 to 100 monomers comprising at least one nonionic monomer and/or at least one anionic monomer and/or at least one cationic monomer.

4. The method according to claim 1, wherein:
   Z=O, and
   A is a linear or structured polymer chain obtained from 1 to 100 monomers comprising at least one nonionic monomer and/or at least one anionic monomer and/or at least one associative cationic monomer.

5. The method according to claim 1, wherein:
   Z=O, and
   A is a linear or structured polymer chain obtained from 1 to 100 monomers comprising at least one nonionic monomer and/or at least one anionic monomer and/or at least one monomer comprising an LCST (lower critical solubility temperature) group.

6. The method according to claim 1, wherein the aqueous phase comprises a water-soluble monomer/precursor of formula (I) ratio of between 12,500:1 and 300,000:1.

7. The method according to claim 1, wherein the precursor is of the formula (II):

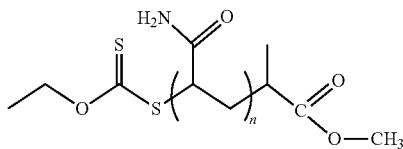

formula (II)

where n is an integer between 1 and 100.

8. The method according to claim 7, wherein the water-soluble monomer is:
a nonionic monomer chosen from the group consisting of acrylamide; methacrylamide; N-isopropylacrylamide; N, N-dimethylacrylamide; N, N diethylacrylamide; N-methylolacrylamide; N-vinylformamide; N-vinyl acetamide; N-vinylpyridine; N-vinylpyrrolidone; acryloyl morpholine (ACMO); glycidyl methacrylate; glyceryl methacrylate; and diacetone acrylamide; or
an unsalified, partially or totally salified anionic monomer chosen from a salt of 3-sulfopropyl methacrylate, or selected from the group consisting of acrylic acid; methacrylic acid; itaconic acid; crotonic acid; maleic acid; fumaric acid; 2-acrylamido 2-methylpropanesulfonic acid; vinylsulfonic acid; vinylphosphonic acid; allylsulfonic acid; allylphosphonic acid; and styrene sulfonic acid.

9. The method according to claim 8, wherein n is an integer between 4 and 50.

10. The method according to claim 1, wherein the water-soluble monomer is chosen from the group consisting of nonionic monomers; anionic monomers; and mixtures of nonionic monomers and anionic monomers.

11. The method according to claim 1, wherein the water-soluble monomer is a nonionic monomer chosen from the group consisting of acrylamide; methacrylamide; N-isopropylacrylamide; N, N-dimethylacrylamide; N, N diethylacrylamide; N-methylolacrylamide; N-vinylformamide; N-vinyl acetamide; N-vinylpyridine; N-vinylpyrrolidone; acryloyl morpholine (ACMO); glycidyl methacrylate; glyceryl methacrylate; and diacetone acrylamide.

12. The method according to claim 1, wherein the water-soluble monomer is a salt of 3-sulfopropyl methacrylate or is an unsalified, partially or totally salified anionic monomer chosen from the group consisting of acrylic acid; methacrylic acid; itaconic acid; crotonic acid; maleic acid; fumaric acid; 2-acrylamido 2-methylpropanesulfonic acid; vinylsulfonic acid; vinylphosphonic acid; allylsulfonic acid; allylphosphonic acid; and styrene sulfonic acid.

13. The method according to claim 1, wherein the obtained polymer has a polydispersity less than or equal to 2.

14. The method according to claim 1, wherein n is an integer between 2 and 500.

15. The method according to claim 1, wherein $R^1$ and $R^2$ are identical or different and are chosen from the group consisting of a linear or branched alkyl group comprising from 1 to 20 carbon atoms; a linear or branched acyl group comprising from 2 to 20 carbon atoms; a linear or branched alkenyl group comprising from 2 to 20 carbon atoms; and a linear or branched alkynyl group comprising from 2 to 20 carbon atoms;
and wherein R represents a linear or branched alkyl group comprising from 1 to 20 carbon atoms, or aryl comprising from 6 to 10 carbon atoms.

16. The method according to claim 1, wherein n is an integer between 3 and 100.

17. The method according to claim 1, wherein the obtained polymer has a polydispersity less than or equal to 1.5.

18. The method according to claim 1, wherein $R^1$ and $R^2$ are identical or different and chosen from the group consisting of a linear or branched alkyl group comprising from 1 to 10 carbon atoms; a linear or branched acyl group comprising from 2 to 10 carbon atoms; a linear or branched alkenyl group comprising from 2 to 10 carbon atoms; and a linear or branched alkynyl group comprising from 2 to 10 carbon atoms;
and wherein R represents a linear or branched alkyl group comprising from 1 to 10 carbon atoms, or aryl comprising from 6 to 10 carbon atoms.

19. The method according to claim 1, wherein the groups and rings (i), (ii) and (iii) may be substituted by groups having a hydrophilic or ionic character selected from alkali metal salts of carboxylic acids, alkali metal salts of sulfonic acid, polyalkylene oxide chains (POE, POP), cationic substituents (quaternary ammonium salts).

20. The method according to claim 19, wherein the polyalkylene oxide chains are selected from POE and POP; and wherein the cationic substituents are selected from quaternary ammonium salts.

* * * * *